(12) United States Patent
Rico et al.

(10) Patent No.: US 10,416,669 B2
(45) Date of Patent: Sep. 17, 2019

(54) MECHANICAL EFFECTS BY WAY OF SOFTWARE OR REAL WORLD ENGAGEMENT

(71) Applicant: SONY INTERACTIVE ENTERTAINMENT INC., Tokyo (JP)

(72) Inventors: Javier Fernandez Rico, Pacifica, CA (US); Glenn Black, San Mateo, CA (US); Michael Taylor, San Mateo, CA (US); Andrew Stephen Young, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 78 days.

(21) Appl. No.: 15/394,329

(22) Filed: Dec. 29, 2016

(65) Prior Publication Data

US 2018/0095433 A1 Apr. 5, 2018

Related U.S. Application Data

(60) Provisional application No. 62/402,704, filed on Sep. 30, 2016.

(51) Int. Cl.
*G05D 1/00* (2006.01)
*B64C 39/02* (2006.01)
(Continued)

(52) U.S. Cl.
CPC ......... *G05D 1/0044* (2013.01); *B64C 39/024* (2013.01); *F41G 3/26* (2013.01);
(Continued)

(58) Field of Classification Search
USPC ...................................................... 701/3–18
See application file for complete search history.

(56) References Cited

U.S. PATENT DOCUMENTS 6,236,365 B1  5/2001  LeBlanc et al.
6,254,394 B1 *  7/2001  Draper .................... F41G 3/26
                                                    434/11
(Continued)

FOREIGN PATENT DOCUMENTS

WO   WO 2018/063594    4/2018

OTHER PUBLICATIONS

Williams, Elliot; "Real-life Space Invaders with Drones and Lasers," Hackaday, Sep. 19, 2016.
(Continued)

*Primary Examiner* — Jonathan L Sample
(74) *Attorney, Agent, or Firm* — Polsinelli LLP

(57) ABSTRACT

A system can determine that a simulated (e.g., virtual) weapon has hit a UAV. This can include determining a simulated position of the simulated weapon and the relative position of the UAV. The system can then determine an area of effect for the weapon and determine if the UAV was hit. The system can determine what components of the UAV were hit and to what degree. The system can then determine a simulated condition such as a damaged engine or wing. The system can then receive input for controlling the UAV and combine the input with the simulated condition to generate a control signal for the UAV. The control signal can include decreasing the power to a motor.

19 Claims, 6 Drawing Sheets

(51) Int. Cl.
*F41G 3/26* (2006.01)
*G06K 9/00* (2006.01)

(52) U.S. Cl.
CPC .. *B64C 2201/042* (2013.01); *B64C 2201/066* (2013.01); *B64C 2201/146* (2013.01); *G06K 9/0063* (2013.01)

(56) References Cited

U.S. PATENT DOCUMENTS

| | | | |
|---|---|---|---|
| 7,912,742 B2 * | 3/2011 | Trautman | G06Q 10/00 |
| | | | 705/5 |
| 7,975,774 B2 * | 7/2011 | Akcasu | A62C 3/025 |
| | | | 169/28 |
| 9,218,316 B2 | 12/2015 | Bernstein et al. | |
| 9,442,485 B1 | 9/2016 | McDermott et al. | |
| 9,605,926 B1 * | 3/2017 | Means | F41G 3/26 |
| 9,632,502 B1 | 4/2017 | Levinson et al. | |
| 10,137,984 B1 * | 11/2018 | Flick | G08G 5/045 |
| 10,210,905 B2 | 2/2019 | Castleman et al. | |
| 10,248,118 B2 | 4/2019 | Bernstein et al. | |
| 2003/0152892 A1 * | 8/2003 | Huang | F41G 3/2694 |
| | | | 434/11 |
| 2004/0008253 A1 | 1/2004 | Monroe | |
| 2004/0172187 A1 * | 9/2004 | Wiseman | G05B 23/0218 |
| | | | 701/100 |
| 2005/0004723 A1 * | 1/2005 | Duggan | G05D 1/0061 |
| | | | 701/24 |
| 2005/0283281 A1 | 12/2005 | Hartmann et al. | |
| 2006/0095262 A1 | 5/2006 | Danielli | |
| 2007/0061116 A1 * | 3/2007 | Bush | G01C 23/00 |
| | | | 703/8 |
| 2007/0130599 A1 | 6/2007 | Monroe | |
| 2008/0144884 A1 | 6/2008 | Habibi | |
| 2008/0154447 A1 | 6/2008 | Spinelli | |
| 2008/0177994 A1 | 7/2008 | Mayer | |
| 2008/0221745 A1 | 9/2008 | Diamandis et al. | |
| 2008/0232602 A1 | 9/2008 | Shearer | |
| 2009/0005167 A1 * | 1/2009 | Arrasvuori | A63H 33/042 |
| | | | 463/40 |
| 2009/0187389 A1 | 7/2009 | Dobbins et al. | |
| 2009/0265105 A1 | 10/2009 | Davis et al. | |
| 2010/0083038 A1 | 4/2010 | Pierce et al. | |
| 2010/0096491 A1 | 4/2010 | Whitelaw et al. | |
| 2010/0305724 A1 | 12/2010 | Fry et al. | |
| 2011/0102459 A1 * | 5/2011 | Hall | A63F 13/10 |
| | | | 345/633 |
| 2011/0199376 A1 | 8/2011 | Salemane | |
| 2011/0311949 A1 | 12/2011 | Preston et al. | |
| 2012/0009845 A1 | 1/2012 | Schmelzer | |
| 2012/0093320 A1 | 4/2012 | Flaks et al. | |
| 2012/0188078 A1 * | 7/2012 | Soles | G08B 13/126 |
| | | | 340/540 |
| 2012/0212399 A1 | 8/2012 | Border et al. | |
| 2012/0232867 A1 * | 9/2012 | Ahrens | F41H 13/0043 |
| | | | 703/6 |
| 2013/0128054 A1 | 5/2013 | Densham et al. | |
| 2013/0137066 A1 * | 5/2013 | Pollak | G09B 9/003 |
| | | | 434/14 |
| 2013/0173089 A1 | 7/2013 | Bernstein et al. | |
| 2013/0328927 A1 | 12/2013 | Mount et al. | |
| 2013/0345910 A1 * | 12/2013 | Kerho | B64D 43/02 |
| | | | 701/14 |
| 2014/0244075 A1 * | 8/2014 | Litwinowicz | G05D 1/0055 |
| | | | 701/3 |
| 2015/0063610 A1 | 3/2015 | Mossner | |
| 2015/0141100 A1 * | 5/2015 | Carter | A63F 9/0291 |
| | | | 463/2 |
| 2015/0248785 A1 | 9/2015 | Holmquist | |
| 2015/0346722 A1 * | 12/2015 | Herz | G05D 1/0038 |
| | | | 701/2 |
| 2015/0378019 A1 | 12/2015 | Schissler et al. | |
| 2016/0078759 A1 | 3/2016 | Nerayoff et al. | |
| 2016/0091894 A1 * | 3/2016 | Zhang | B64C 39/024 |
| | | | 701/2 |
| 2016/0111006 A1 | 4/2016 | Srivastava et al. | |
| 2016/0117853 A1 | 4/2016 | Zhong et al. | |
| 2016/0196754 A1 | 7/2016 | Surace | |
| 2016/0205654 A1 | 7/2016 | Robinson | |
| 2016/0284125 A1 | 9/2016 | Bostick et al. | |
| 2016/0307447 A1 * | 10/2016 | Johnson | B60L 58/12 |
| 2016/0330601 A1 * | 11/2016 | Srivastava | G06Q 50/265 |
| 2016/0358497 A1 * | 12/2016 | Nguyen | H04L 63/1433 |
| 2017/0036771 A1 | 2/2017 | Woodman et al. | |
| 2017/0045886 A1 | 2/2017 | Liu et al. | |
| 2017/0053169 A1 | 2/2017 | Cuban et al. | |
| 2017/0061813 A1 | 3/2017 | Tao et al. | |
| 2017/0116723 A1 | 4/2017 | Aughey | |
| 2017/0158353 A1 | 6/2017 | Schmick | |
| 2017/0165575 A1 | 6/2017 | Ridihalgh et al. | |
| 2017/0166204 A1 | 6/2017 | Yoo et al. | |
| 2017/0168488 A1 | 6/2017 | Wierzynski et al. | |
| 2017/0168556 A1 | 6/2017 | Goslin et al. | |
| 2017/0173451 A1 | 6/2017 | Pedersen et al. | |
| 2017/0182407 A1 * | 6/2017 | Steele | A63F 13/235 |
| 2017/0251323 A1 | 8/2017 | Jo et al. | |
| 2017/0295446 A1 * | 10/2017 | Thagadur Shivappa | |
| | | | G06F 3/011 |
| 2017/0329347 A1 | 11/2017 | Passot et al. | |
| 2017/0337826 A1 | 11/2017 | Moran et al. | |
| 2017/0343375 A1 | 11/2017 | Kamhi et al. | |
| 2017/0371353 A1 | 12/2017 | Millinger | |
| 2018/0322699 A1 | 1/2018 | Gray et al. | |
| 2018/0032071 A1 | 2/2018 | Wieneke | |
| 2018/0093171 A1 | 4/2018 | Mallinson | |
| 2018/0093768 A1 | 4/2018 | Castleman | |
| 2018/0093781 A1 | 4/2018 | Mallinson | |
| 2018/0094931 A1 | 4/2018 | Taylor | |
| 2018/0095433 A1 * | 4/2018 | Rico | B64C 39/024 |
| 2018/0095461 A1 * | 4/2018 | Taylor | G06T 19/006 |
| 2018/0095463 A1 | 4/2018 | Castleman | |
| 2018/0095714 A1 * | 4/2018 | Taylor | G06F 3/165 |
| 2018/0096455 A1 | 4/2018 | Taylor | |
| 2018/0096611 A1 | 4/2018 | Kikuchi | |
| 2018/0098052 A1 | 4/2018 | Black | |
| 2018/0246514 A1 | 8/2018 | Mitomo et al. | |
| 2018/0259339 A1 | 9/2018 | Johnson et al. | |
| 2018/0321692 A1 | 11/2018 | Castillo-Effen et al. | |
| 2018/0329413 A1 | 11/2018 | Charalambides et al. | |
| 2019/0019329 A1 | 1/2019 | Eyler et al. | |
| 2019/0047700 A1 | 2/2019 | Liu et al. | |
| 2019/0075252 A1 | 3/2019 | Zhao et al. | |
| 2019/0079722 A1 | 3/2019 | Taylor | |

OTHER PUBLICATIONS

U.S. Appl. No. 15/711,695, Dominic S. Mallinson, Unmanned Aerial Vehicle Movement via Environmental Airflow, filed Sep. 21, 2017.
U.S. Appl. No. 15/711,961, Dominic S. Mallinson, Unmanned Aerial Vehicle Movement via Environmental Interactions, filed Sep. 21, 2017.
U.S. Appl. No. 15/394,391 Office Action dated Feb. 23, 2018.
U.S. Appl. No. 15/393,855 Office Action dated May 16, 2018.
Fujii, Katsuya; Higuchi, Keita; Rekimoto, Jun; "Endless Flyer: A Continuous Flying Drone with Automatic Battery Replacement", 2013 IEEE 10th International Conference on Ubiquitous Intelligence & Computing and 2013 IEEE 10th International Conference on Autonomic & Trusted Computing, pp. 216-223.
U.S. Appl. No. 15/394,473, Dennis Castleman, UAV Battery Form Factor and Insertion/Ejection Methodologies, filed Dec. 29, 2016.
U.S. Appl. No. 15/394,313, Michael Taylor, Proximity Based Noise and Chat, filed Dec. 29, 2016.
PCT Application No. PCT/US2017/048064 International Search Report and Written Opinion dated Nov. 7, 2017.
U.S. Appl. No. 15/394,313 Office Action dated Oct. 18, 2017.
U.S. Appl. No. 16/121,441, Michael Taylor, Proximity Based Noise and Chat, filed Sep. 4, 2018.
PCT Application No. PCT/US2017/048064 International Preliminary Report on Patentability dated Apr. 2, 2019.

(56) References Cited

OTHER PUBLICATIONS

U.S. Appl. No. 15/394,267 Final Office Action dated Apr. 19, 2019.
U.S. Appl. No. 16/121,441 Office Action dated May 15, 2019.
U.S. Appl. No. 15/393,855 Final Office Action dated May 17, 2019.
Bai, Z., Blackwell, A., Coulouris, G.; Using augmented reality to elicit pretend play for children with autism. IEEE Transactions on Visualization & Computer Graphics. May 1, 2015(1):1.
Thon S, Serena-Allier D, Salvetat C, Lacotte F.; "Flying a dron in a museum an augmented-reality serious game in a Provence", InDigital Heritage International Congress (DigitalHeritage), Oct. 28, 2013 (vol. 2, pp. 669-676), IEEE. (Year: 2013).
U.S. Appl. No. 15/394,285 Final Office Action dated Feb. 26, 2019.
U.S. Appl. No. 15/393,855 Office Action dated Feb. 1, 2019.

\* cited by examiner

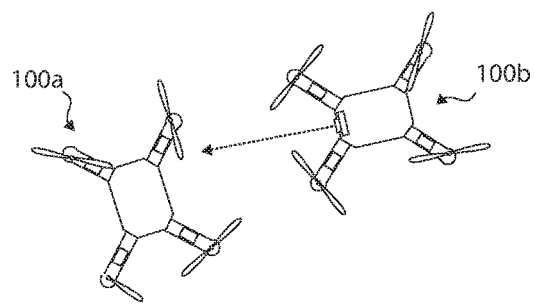
FIG. 7A
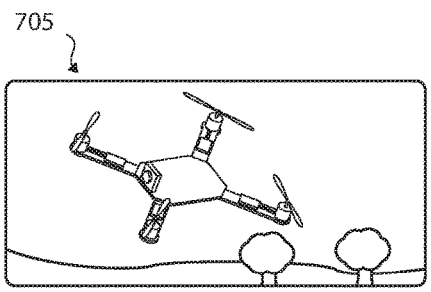 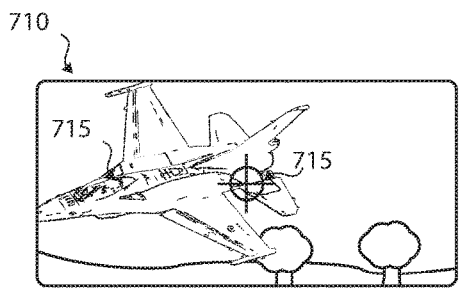
FIG. 7B                FIG. 7C

US 10,416,669 B2

MECHANICAL EFFECTS BY WAY OF SOFTWARE OR REAL WORLD ENGAGEMENT

CROSS-REFERENCE TO RELATED APPLICATIONS

The present patent application claims the priority benefit of U.S. provisional patent application 62/402,704 filed on Sep. 30, 2016, the disclosure of which is incorporated by reference herein.

BACKGROUND

Field of the Invetnion

The present technology pertains to augmented reality, and more specifically pertains to simulating damage to unmanned aerial vehicles (UAVs).

Description of the Related Art

Augmented reality includes mixing real world objects with virtual or simulated objects. Typically, the simulated objects are overlaid on a video stream. Interaction between the virtual objects and the real world objects has proven to be a challenge. Although techniques are being developed for having real world objects effect the virtual objects, having the virtual objects effect the real world objects faces many physical restraints. This can make augmented reality less immersive and less enjoyable for many users.

Additionally, unmanned aerial vehicles (UAVs) or drones have recently risen in popularity and people have begun experimenting with racing and aerial combat. UAVs however can break easily when they collide with another object. Repairing and replacing parts on a UAV can be frustrating and expensive.

SUMMARY OF THE PRESENTLY CLAIMED INVENTION

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for simulating vehicle damage within an augmented reality environment. For example, a system determine that a simulated (e.g., virtual) weapon has hit a UAV. This can include determining a simulated position of the simulated weapon and the relative position of the UAV. The system can then determine an area of effect for the weapon and determine if the UAV was hit. The system can determine what components of the UAV were hit and to what degree. The system can then determine a simulated condition such as a damaged engine or wing. The system can then receive input for controlling the UAV and combine the input with the simulated condition to generate a control signal for the UAV. The control signal can include decreasing the power to a motor.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 7A, 7B, and 7C show an example augmented reality system according to some embodiments.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for simulating vehicle damage within an augmented reality environment.

Figure 1:
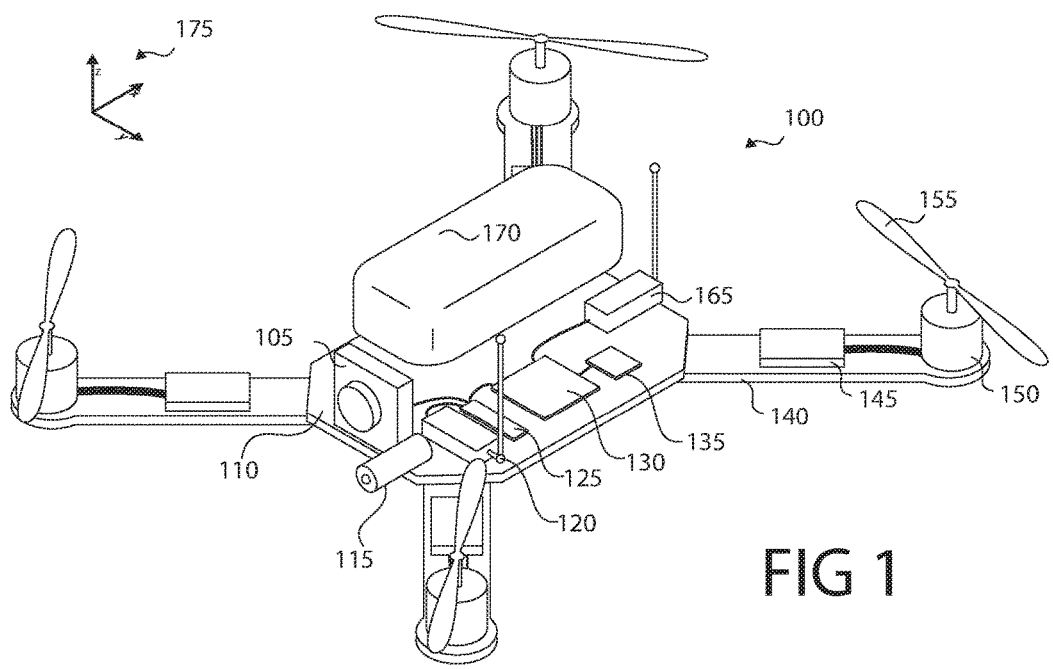
FIG. 1 shows an unmanned aerial vehicle (UAV) according to some embodiments.

FIG. 1 shows unmanned aerial vehicle (UAV) 100 according to some embodiments. UAV 100 can have one or more motors 150 configured to rotate attached propellers 155 in order to control the position of UAV 100 in the air. UAV 100 can be configured as a fixed wing vehicle (e.g., airplane), a rotary vehicle (e.g., a helicopter or multirotor), or a blend of the two. For the purpose of FIG. 1, axes 175 can assist in the description of certain features. If UAV 100 is oriented parallel to the ground, the Z axis can be the axis perpendicular to the ground, the X axis can generally be the axis that passes through the bow and stern of UAV 100, and the Y axis can be the axis that pass through the port and starboard sides of UAV 100. Axes 175 are merely provided for convenience of the description herein.

In some embodiments, UAV 100 has main body 110 with one or more arms 140. The proximal end of arm 140 can attach to main body 110 while the distal end of arm 140 can secure motor 150. Arms 140 can be secured to main body 110 in an "X" configuration, an "H" configuration, a "T" configuration, or any other configuration as appropriate. The number of motors 150 can vary, for example there can be three motors 150 (e.g., a "tricopter"), four motors 150 (e.g., a "quadcopter"), eight motors (e.g., an "octocopter"), etc.

In some embodiments, each motor 155 rotates (i.e., the drive shaft of motor 155 spins) about parallel axes. For example, the thrust provided by all propellers 155 can be in the Z direction. Alternatively, a motor 155 can rotate about an axis that is perpendicular (or any angle that is not parallel) to the axis of rotation of another motor 155. For example, two motors 155 can be oriented to provide thrust in the Z direction (e.g., to be used in takeoff and landing) while two motors 155 can be oriented to provide thrust in the X direction (e.g., for normal flight). In some embodiments, UAV 100 can dynamically adjust the orientation of one or more of its motors 150 for vectored thrust.

In some embodiments, the rotation of motors 150 can be configured to create or minimize gyroscopic forces. For example, if there are an even number of motors 150, then half of the motors can be configured to rotate counter-clockwise while the other half can be configured to rotate clockwise. Alternating the placement of clockwise and counter-clockwise motors can increase stability and enable UAV 100 to rotate about the z-axis by providing more power to one set of motors 150 (e.g., those that rotate clockwise) while providing less power to the remaining motors (e.g., those that rotate counter-clockwise).

Motors 150 can be any combination of electric motors, internal combustion engines, turbines, rockets, etc. In some embodiments, a single motor 150 can drive multiple thrust components (e.g., propellers 155) on different parts of UAV 100 using chains, cables, gear assemblies, hydraulics, tubing (e.g., to guide an exhaust stream used for thrust), etc. to transfer the power.

In some embodiments, motor 150 is a brushless motor and can be connected to electronic speed controller X45. Electronic speed controller 145 can determine the orientation of magnets attached to a drive shaft within motor 150 and, based on the orientation, power electromagnets within motor 150. For example, electronic speed controller 145 can have three wires connected to motor 150, and electronic speed controller 145 can provide three phases of power to the electromagnets to spin the drive shaft in motor 150. Electronic speed controller 145 can determine the orientation of the drive shaft based on back-emf on the wires or by directly sensing to position of the drive shaft.

Transceiver 165 can receive control signals from a control unit (e.g., a handheld control transmitter, a server, etc.). Transceiver 165 can receive the control signals directly from the control unit or through a network (e.g., a satellite, cellular, mesh, etc.). The control signals can be encrypted. In some embodiments, the control signals include multiple channels of data (e.g., "pitch," "yaw," "roll," "throttle," and auxiliary channels). The channels can be encoded using pulse-width-modulation or can be digital signals. In some embodiments, the control signals are received over TC/IP or similar networking stack.

In some embodiments, transceiver 165 can also transmit data to a control unit. Transceiver 165 can communicate with the control unit using lasers, light, ultrasonic, infra-red, Bluetooth, 802.11x, or similar communication methods, including a combination of methods. Transceiver can communicate with multiple control units at a time.

Position sensor 135 can include an inertial measurement unit for determining the acceleration and/or the angular rate of UAV 100, a GPS receiver for determining the geolocation and altitude of UAV 100, a magnetometer for determining the surrounding magnetic fields of UAV 100 (for informing the heading and orientation of UAV 100), a barometer for determining the altitude of UAV 100, etc. Position sensor 135 can include a land-speed sensor, an air-speed sensor, a celestial navigation sensor, etc.

UAV 100 can have one or more environmental awareness sensors. These sensors can use sonar, LiDAR, stereoscopic imaging, computer vision, etc. to detect obstacles and determine the nearby environment. For example, a collision avoidance system can use environmental awareness sensors to determine how far away an obstacle is and, if necessary, change course.

Position sensor 135 and environmental awareness sensors can all be one unit or a collection of units. In some embodiments, some features of position sensor 135 and/or the environmental awareness sensors are embedded within flight controller 130.

In some embodiments, an environmental awareness system can take inputs from position sensors 135, environmental awareness sensors, databases (e.g., a predefined mapping of a region) to determine the location of UAV 100, obstacles, and pathways. In some embodiments, this environmental awareness system is located entirely on UAV 100, alternatively, some data processing can be performed external to UAV 100.

Camera 105 can include an image sensor (e.g., a CCD sensor, a CMOS sensor, etc.), a lens system, a processor, etc. The lens system can include multiple movable lenses that can be adjusted to manipulate the focal length and/or field of view (i.e., zoom) of the lens system. In some embodiments, camera 105 is part of a camera system which includes multiple cameras 105. For example, two cameras 105 can be used for stereoscopic imaging (e.g., for first person video, augmented reality, etc.). Another example includes one camera 105 that is optimized for detecting hue and saturation information and a second camera 105 that is optimized for detecting intensity information. In some embodiments, camera 105 optimized for low latency is used for control systems while a camera 105 optimized for quality is used for recording a video (e.g., a cinematic video). Camera 105 can be a visual light camera, an infrared camera, a depth camera, etc.

A gimbal and dampeners can help stabilize camera 105 and remove erratic rotations and translations of UAV 100. For example, a three-axis gimbal can have three stepper motors that are positioned based on a gyroscope reading in order to prevent erratic spinning and/or keep camera 105 level with the ground.

Video processor 125 can process a video signal from camera 105. For example video process 125 can enhance the image of the video signal, down-sample or up-sample the resolution of the video signal, add audio (captured by a microphone) to the video signal, overlay information (e.g., flight data from flight controller 130 and/or position sensor), convert the signal between forms or formats, etc.

Video transmitter 120 can receive a video signal from video processor 125 and transmit it using an attached antenna. The antenna can be a cloverleaf antenna or a linear antenna. In some embodiments, video transmitter 120 uses a different frequency or band than transceiver 165. In some embodiments, video transmitter 120 and transceiver 165 are part of a single transceiver.

Battery 170 can supply power to the components of UAV 100. A battery elimination circuit can convert the voltage from battery 170 to a desired voltage (e.g., convert 12 v from battery 170 to 5 v for flight controller 130). A battery elimination circuit can also filter the power in order to minimize noise in the power lines (e.g., to prevent interference in transceiver 165 and transceiver 120). Electronic speed controller 145 can contain a battery elimination circuit. For example, battery 170 can supply 12 volts to electronic speed controller 145 which can then provide 5 volts to flight controller 130. In some embodiments, a power distribution board can allow each electronic speed controller (and other devices) to connect directly to the battery.

In some embodiments, battery 170 is a multi-cell (e.g., 2 S, 3 S, 4 S, etc.) lithium polymer battery. Battery 170 can also be a lithium-ion, lead-acid, nickel-cadmium, or alkaline battery. Other battery types and variants can be used as known in the art. Additional or alternative to battery 170, other energy sources can be used. For example, UAV 100 can use solar panels, wireless power transfer, a tethered power cable (e.g., from a ground station or another UAV 100), etc. In some embodiments, the other energy source can be utilized to charge battery 170 while in flight or on the ground.

Battery 170 can be securely mounted to main body 110. Alternatively, battery 170 can have a release mechanism. In some embodiments, battery 170 can be automatically replaced. For example, UAV 100 can land on a docking station and the docking station can automatically remove a discharged battery 170 and insert a charged battery 170. In some embodiments, UAV 100 can pass through docking station and replace battery 170 without stopping.

Battery 170 can include a temperature sensor for overload prevention. For example, when charging, the rate of charge can be thermally limited (the rate will decrease if the temperature exceeds a certain threshold). Similarly, the power delivery at electronic speed controllers 145 can be thermally limited—providing less power when the temperature exceeds a certain threshold. Battery 170 can include a charging and voltage protection circuit to safely charge battery 170 and prevent its voltage from going above or below a certain range.

UAV 100 can include a location transponder. For example, in a racing environment, race officials can track UAV 100 using location transponder. The actual location (e.g., X, Y, and Z) can be tracked using triangulation of the transponder. In some embodiments, gates or sensors in a track can determine if the location transponder has passed by or through the sensor or gate.

Flight controller 130 can communicate with electronic speed controller 145, battery 170, transceiver 165, video processor 125, position sensor 135, and/or any other component of UAV 100. In some embodiments, flight controller 130 can receive various inputs (including historical data) and calculate current flight characteristics. Flight characteristics can include an actual or predicted position, orientation, velocity, angular momentum, acceleration, battery capacity, temperature, etc. of UAV 100. Flight controller 130 can then take the control signals from transceiver 165 and calculate target flight characteristics. For example, target flight characteristics might include "rotate x degrees" or "go to this GPS location". Flight controller 130 can calculate response characteristics of UAV 100. Response characteristics can include how electronic speed controller 145, motor 150, propeller 155, etc. respond, or are expected to respond, to control signals from flight controller 130. Response characteristics can include an expectation for how UAV 100 as a system will respond to control signals from flight controller 130. For example, response characteristics can include a determination that one motor 150 is slightly weaker than other motors.

After calculating current flight characteristics, target flight characteristics, and response characteristics flight controller 130 can calculate optimized control signals to achieve the target flight characteristics. Various control systems can be implemented during these calculations. For example a proportional-integral-derivative (PID) can be used. In some embodiments, an open-loop control system (i.e., one that ignores current flight characteristics) can be used. In some embodiments, some of the functions of flight controller 130 are performed by a system external to UAV 100. For example, current flight characteristics can be sent to a server that returns the optimized control signals. Flight controller 130 can send the optimized control signals to electronic speed controllers 145 to control UAV 100.

In some embodiments, UAV 100 has various outputs that are not part of the flight control system. For example, UAV 100 can have a loudspeaker for communicating with people or other UAVs 100. Similarly, UAV 100 can have a flashlight or laser. The laser can be used to "tag" another UAV 100.

Figure 2:
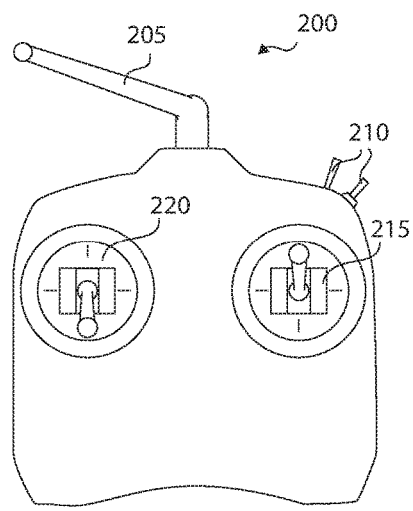
FIG. 2 shows a control transmitter according to some embodiments.

UAV 100 can have blaster 115 for interacting with other UAVs, the environment, or simulated objects. Blaster 115 can be a laser, flashlight (e.g., for infrared or visible light), projectile launcher (e.g., to send darts, balls, or other objects in the air), etc. In some embodiments, blaster 115 is passive and merely serves as an indicator for the positioning of a corresponding simulated blaster that FIG. 2 shows control transmitter 200 according to some embodiments. Control transmitter 200 can send control signals to transceiver 165. Control transmitter can have auxiliary switches 210, joysticks 215 and 220, and antenna 205. Joystick 215 can be configured to send elevator and aileron control signals while joystick 220 can be configured to send throttle and rudder control signals (this is termed a mode 2 configuration). Alternatively, joystick 215 can be configured to send throttle and aileron control signals while joystick 220 can be configured to send elevator and rudder control signals (this is termed a mode 1 configuration). Auxiliary switches 210 can be configured to set options on control transmitter 200 or UAV 100. In some embodiments, control transmitter 200 receives information from a transceiver on UAV 100. For example, it can receive some current flight characteristics from UAV 100.

Figure 3:
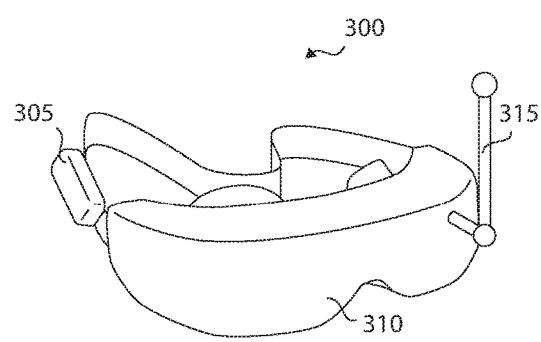
FIG. 3 shows a display according to some embodiments.

FIG. 3 shows display 300 according to some embodiments. Display 300 can include battery 305 or another power source, display screen 310, and receiver 315. Display 300 can receive a video stream from transmitter 120 from UAV 100. Display 300 can be a head-mounted unit as depicted in FIG. 3. Display 300 can be a monitor such that multiple viewers can view a single screen. In some embodiments, display screen 310 includes two screens, one for each eye; these screens can have separate signals for stereoscopic viewing. In some embodiments, receiver 315 is mounted on display 3100 (as should in FIG. 3), alternatively, receiver 315 can be a separate unit that is connected using a wire to display 300. In some embodiments, display 300 is mounted on control transmitter 200.

Figure 4:
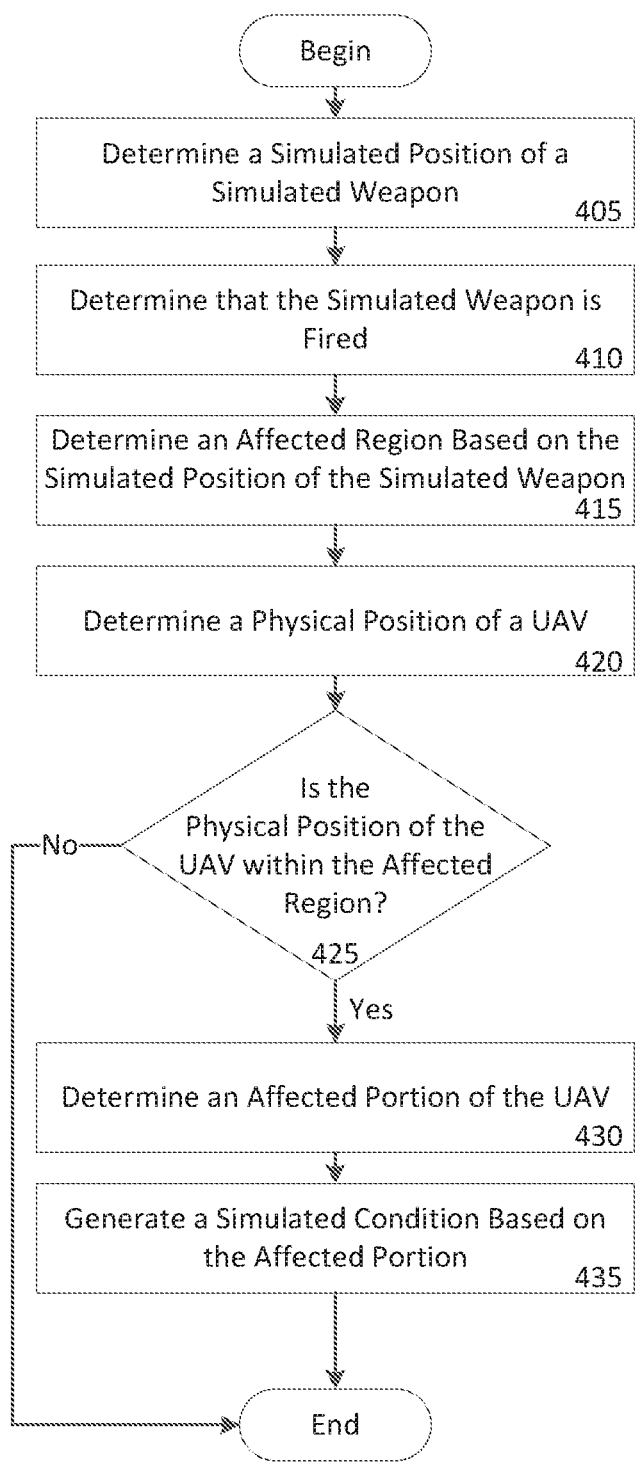
FIG. 4 shows an example method for a simulated hit on a UAV.

FIG. 4 shows an example method for a simulated hit on UAV 100. A system performing the example method can begin and determine a simulated position of a simulated weapon (step 405). A position (real or simulated) can include location, orientation, and scale (e.g., whereby the simulated object may be much larger than the underlying UAV). In some embodiments, UAV 100 can determine the simulated position of the simulated weapon. For example, camera 105 can detect a marker on the ground indicating a weapon (such as a tank). In some embodiments, another device (aside from UAV 100) can detect a marker to inform the simulated position of the simulated weapon. For example, a camera assembly on the ground can detect the position of balloons in the sky which can be associated with the locations of weapons. In some embodiments, a server can determine the simulated position of the simulated weapon within a virtual space (e.g., by controlling the simulated weapon using an artificial intelligence procedure).

In some embodiments, an arena server can detect the position of UAV 100 (or multiple UAVs 100) and calculate the positions of multiple simulated weapons. The arena server can then manage the simulation of interactions between UAV 100 and simulated elements. This can include determining if UAV 100 is "hit" by a weapon, runs into a wall, suffers damage, etc.

The simulated weapon can be derived from blaster 115 of UAV 100. For example, a first UAV 100 can be in a dogfight with a second UAV 100 and the first UAV 100 can "fire" from its blaster 115 at the second UAV 100. In some embodiments, "firing" blaster 115 can include shining a laser, activating a light, launching a projectile, etc.; each of which can be detected by another UAV 100 or a ground-based detector. In some embodiments, UAV 100 does not have blaster 115 and UAV 100 can impart properties to the simulated weapon. For example, the simulated weapon can point straight from camera 105.

UAV 100 can broadcast its location and orientation to a server or another UAV 100; the broadcast can include the location and orientation of the simulated weapon. For example, the simulated weapon can include an orientation that is different from the orientation of UAV 100.

In some embodiments, a first UAV 100 can directly detect a second UAV 100 and determine the position of the simulated weapon based on blaster 115 of the second UAV 100. This detection can be accomplished using computer vision or by receiving a signal from the second UAV 100.

In some embodiments, a real world object can indicate the location of the simulated weapon. Additional to blaster 115 and UAV 100, a balloon or a marker can indicate the location of the simulated weapon. In some embodiments, the simulated weapon is entirely virtual and not based on the position of a real-world object. For example a tank can be simulated even though nothing exists in the real world representing the tank or indicating a location of the tank.

The simulated weapon can fire projectiles (e.g., as would a gun), have a beam (e.g., as would a laser), have an area of effect (e.g., as would a bomb, an anti-aircraft gun, etc.), etc. In some embodiments, the simulated weapon can be a weapon that does not exist in the real world, like a blaster that can distort space, time, and/or gravity. The weapon does not need to have destructive capabilities, for example, the weapon can slow down or speed up UAV 100. The weapon can be effective to simulate "painting" targets with color (imparting no damage). In some embodiments, other alternatives to weapons can be implemented, for example, a volcano (which shoots lava), a meteor shower, a tornado, etc.

The system can continue and determine that the simulated weapon is fired (410). For example a first UAV 100 can detect that a second UAV 100 has fired (and detect the position of the simulated weapon) if a laser or similar light from blaster 115 makes contact with the first UAV 100. This can be accomplished by detecting a button press by a user to fire the weapon. In some embodiments, detecting that the simulated weapon was fired includes an algorithm deciding to fire the weapon. In some embodiments, detecting that that simulated weapon was fired includes detecting an emission from blaster 115 (such as light or an RF signal).

The system can then determine an affected region based on the simulated position of the simulated weapon (step 415). This can include determining a path of a simulated projectile of the simulated weapon, determine an area (or volume) of effect of the simulated weapon, etc. The affected region can change over time (e.g., as a simulated explosion grows and contracts, as a simulated projectile moves through space, etc.).

The system can then determine a physical position of a UAV (step 420). For example, UAV 100 can have transponders that can be detected by nearby receivers. UAV 100 can receive GPS signals and determine UAV's 100 location based on the GPS signals. In some embodiments, UAV 100 can detect its position using computer vision, position sensor 135, dead reckoning, etc. The physical position can be absolute (e.g., the geolocation of UAV 100 in latitude and longitude) or relative (e.g., the location of UAV in a park or the location of UAV relative to the simulated weapon). The physical position can include location and/or orientation.

The system can then determine if the physical position of the UAV is within the affected region (step 425). In some embodiments, step 425 can be based on the simulated position of the simulated weapon and the physical position of the UAV 100. The physical position of UAV 100 can be mapped to a virtual coordinate system containing the simulated weapon. In some embodiments, the system can determine the simulated position of the simulated weapon relative to the position of UAV 100. For example, a beacon can indicate the position of the simulated weapon and UAV 100 can detect its position relative to the beacon. In some embodiments, a real projectile (e.g., a foam ball or dart) can be launched from blaster 115 and a hit can be determined if the projectile hits (or comes close to) another UAV 100.

If the physical position of UAV 100 is outside the affected region, the method can end. If the physical position of UAV 100 is within the affected region, the system can then determine an affected portion of the UAV (step 430). The affection portion of UAV 100 can correspond to a damage simulation based on the affected region and a simulation of what type of damage the simulated weapon would cause to UAV 100 if the simulated weapon were real. For example, if the weapon is a missile launcher, the damage a missile would cause to UAV 100. In some embodiments, the affected portion is based on an object simulation informed by UAV 100. For example, UAV 100 can represent an object (e.g., a fighter jet, a hot air balloon, a dragon, etc.) and the affected portion can be based on the object (e.g., the wing, balloon, tail, etc.) can be effected. In some embodiments, once UAV 100 is hit, the individual portion that is hit can be determined randomly. The degree of intensity of the hit can be simulated (e.g., based on the distance between UAV 100 and the simulated weapon, the characteristics of the weapon, etc.), determined randomly, or a combination thereof. In some embodiments, UAV 100 has an overall health value and, as it is hit, the health value can decrease. When it goes below a certain health value, certain components can be considered damaged (e.g., first a rudder can lose functionality, then a motor, then a second motor, etc.). Such damage may be component-specific, as would be the effects of such damage. Where a hit is determined to affect an engine, for example, the simulated effect may mimic a damaged engine.

The system can then generate a simulated condition based on the affected portion (step 435). A simulated condition can be damage incurred by UAV 100 or a simulated object that UAV 100 represents. For example, the simulated condition can include damage to propeller 155, motor 150, electronic speed controller 145, arm 140, battery 170, receiver 165, camera 105, blaster 115, position sensor 135, a wing, a body part (for a creature), a wheel, etc. The simulated condition can be complete disablement of the affected portion, a decrease in functionality (e.g., a motor being at 60% capacity), or a malfunction (e.g., a part working intermittently, a propeller being off-balance, etc.). In some embodiments, the simulated condition is recoil from firing a simulated weapon, a simulated load (e.g., a simulated heavy weight), that UAV 100 is carrying, etc.

Figure 5:
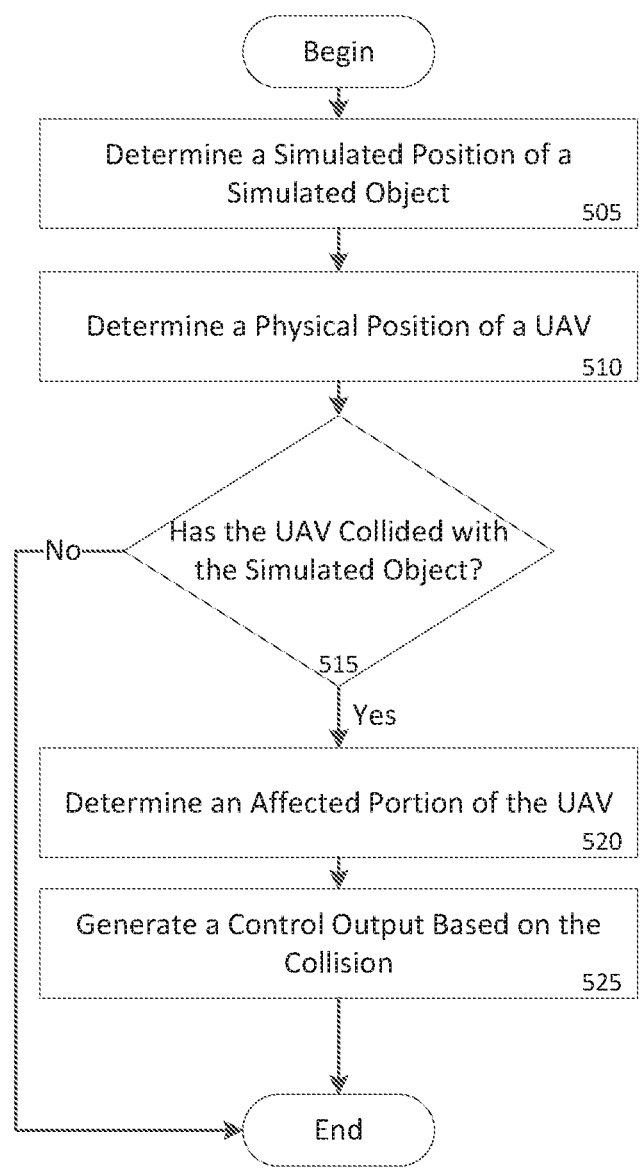
FIG. 5 shows an example method for simulating a collision between a UAV and a simulated object.

FIG. 5 shows an example method for simulating a collision between UAV 100 and a simulated object. A system performing this method can determine a simulated position of a simulated object (step 505). The simulated object can include a boundary (such as a wall), an environmental condition (e.g., wind, rain, fire, dust, smoke, lightning, greater or less gravity, etc.), debris, a simulated ground (e.g., even though UAV 100 might be well above the earth, the simulated ground can appear right below UAV 100), a vehicle (e.g., a UAV, plane, tank, etc.), a power-up (e.g., something that augments or diminishes the capabilities of UAV 100), etc. Similar to step 405 of FIG. 4, determining a simulated position of a simulated object can include detecting a marker representing the simulated object.

The system can then determine a physical position of a UAV (step 510). The physical position of UAV 100 can be mapped to a virtual position along with the simulated object; alternatively, the simulated position of the simulated object can be mapped to a real-world position along with UAV 100.

The system can then determine whether the UAV collided with the simulated object (step 515),If UAV 100 did not collide with the simulated object, the system can then stop performing the example method. If UAV 100 did collide with the simulated object, the system can determine the affected portion of the UAV (step 520). Step 520 can be an example of step 430 of FIG. 4.

The system can then generate a control output based on the collision (step 525). For example, the system can modify the input controls (e.g., from control transmitter 200) to make UAV 100 respond unpredictably. For example, the total throttle input can be limited, the orientation of joysticks 220 and 215 can be modified, the signal from antenna 205 can be enhanced or made to appear weaker, the signal received by receiver 165 can appear weaker, etc. Further, the video signal may be weakened or distorted, as well as include various other visual effects that may be associated with a collision.

The system can modify the output controls similarly; for example, the system can limit the total amount of power that a motor can provide, the power of transmitter 220, etc. Other ways to modify the control output are contemplated, including distorting the signal from camera 105 (e.g., if UAV 100 flies through simulated rain, the camera can show distortions from the water), causing UAV 100 to at least partially lose power, simulating a force on a part of UAV 100 (e.g., to simulate hitting a barrier), simulating turbulence, simulating extreme altitude effects, causing data to be ignored from position sensor 135 (e.g., to simulate losing a GPS signal).

In some embodiments, the control output is an output to a user interface device such as display 300. For example, certain data can be shown or hidden. It should be understood that neither the collision nor the generating of the control output based on the collision need be a negative effect. For example, the object can augment the functionality of UAV 100.

Figure 6A:
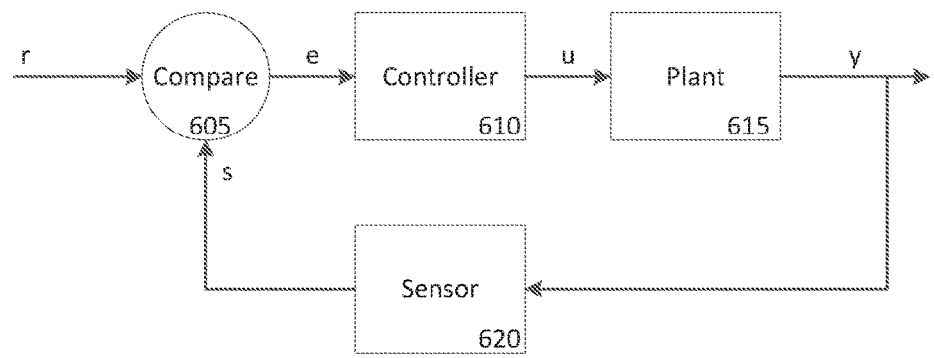
FIG. 6A shows a conventional simplified feedback control system.

FIG. 6A shows a conventional simplified feedback control system. A reference value "r" (e.g., an input from control transmitter 200, a target value for position or heading, etc.) can be compared with sensor data "s" from sensor 620. This comparison can occur at comparator 605. Comparator 605 can generate an error "e" which represents the difference between the reference value and the sensor value. For example, if control transmitter 200 sent a signal to move forward by 100 and the sensor detects a movement of 50, then comparator 605 can indicate an error of negative 50. Controller 610 can then take the error and generate a control signal "u". In some embodiments, comparator 605 is a part of a controller unit 610 (e.g., flight controller 130). The combination of the reference value (or input) and the sensor data can be used to determine an optimal control signal u. Plant 615 can be physical device that converts the control signal to actual motion or other physical output. Plant 615 can be a motor, actuator, servo, transmitter, etc. Result "y" can be the physical result from plant 615. For example, if plant 615 is a motor and it spins, the result can be that UAV 100 moves. This can then be detected by sensor 620. It should be understood that FIG. 6A presents a simplified model of a feedback control system and multiple components can be inserted into the feedback loop and feedback loops can combine in various ways. Furthermore, multiple inputs "r" and sensor data "s" can be analyzed by comparator 605 and controller 610 while controller 610 can output multiple control signals "u" (e.g., for various motors).

Figure 6B:
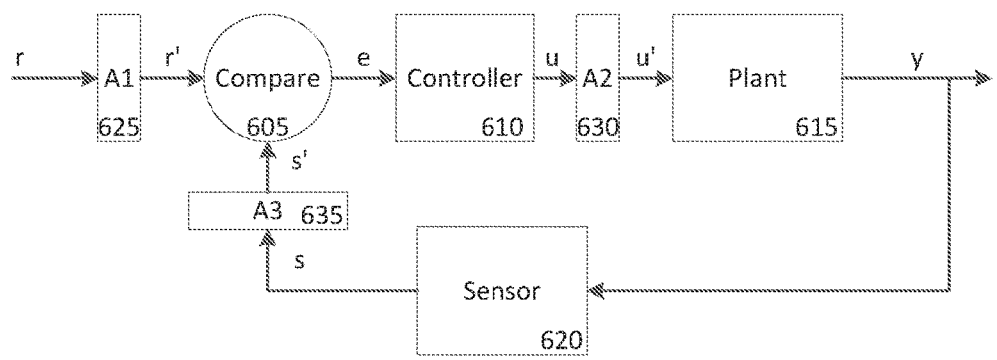
FIG. 6B shows an example feedback control system with modifiers.

FIG. 6B shows an example feedback control system similar to that shown in FIG. 6A but with modifiers A1 625, A2 630, and A3 635. Any one of the modifiers can be present and can modify a signal to simulate a condition like step 525. For example, modifier 625 can modify the input signal r to be modified reference signal r'. This can include limiting the signal from joysticks 220 and 215, rotating the orientation of joystick 215 (e.g., so that pushing "up" will be converted to 5 degrees clockwise from up), randomly altering the signal to simulate noise, artificially decreasing the sampling rate of the input signal, artificially dropping the input signal, cause UAV 100 to spin by simulating a "right" on joystick 115, etc.

Modifier 635 can modify the sensor 620 signal s to be modified sensor signal s'. For example, modifier 635 can artificially decrease the polling frequency, simulate damage to position sensor 135 (e.g., simulate a broken sensor), add noise to the sensor signal s, etc.

Modifier 630 can modify the control signal u to be u'. For example, modifier 630 can boost or decrease the power of the control signal, modifier 630 can simulate a faulty wire to plant 615.

Modifiers 625, 630, and 635 can have temporary effects that only last for a few seconds, during a game or dog-fight, or until the system is reset. It should be understood that the feedback system in FIG. 6B is one of many embodiments. For example, a modifier can be placed within controller 610. The principles herein disclosed can be applied to a variety of control systems and simulations.

FIGS. 7A, 7B, and 7C show an example augmented reality system according to some embodiments. For example, FIG. 7A can represent the actual location of a first UAV 100a which is being seen by a second UAV 100b. The dashed arrow indicates the center of the view from camera 105 from second UAV 100b. FIG. 7B can represent the raw video 705 from camera 105 from the second UAV 100b. The raw video 705 can be analyzed by a system to determine the relative location of UAV 100a.

FIG. 7C shows how the system can then replace the image of UAV 100a in processed video 710 with a virtual object such as jet fighter 715. The system can then add reticle 715 to processed video 710. A user assigned to UAV 100b then view processed video 710 and hit a button on the user's control transmitter 200 to hit UAV 100a. The system can then analyze processed video 710 to determine that UAV 100a was hit in its rear and, if UAV 100a is simulating a jet fighter, the hit can modify the simulation of the jet fighter (e.g., to simulate damage to an aileron). Alternatively, the hit can modify the performance of UAV 100a as a quadcopter. For example, the system can simulate damage to the appropriate rearward motor.

Figure 8A:
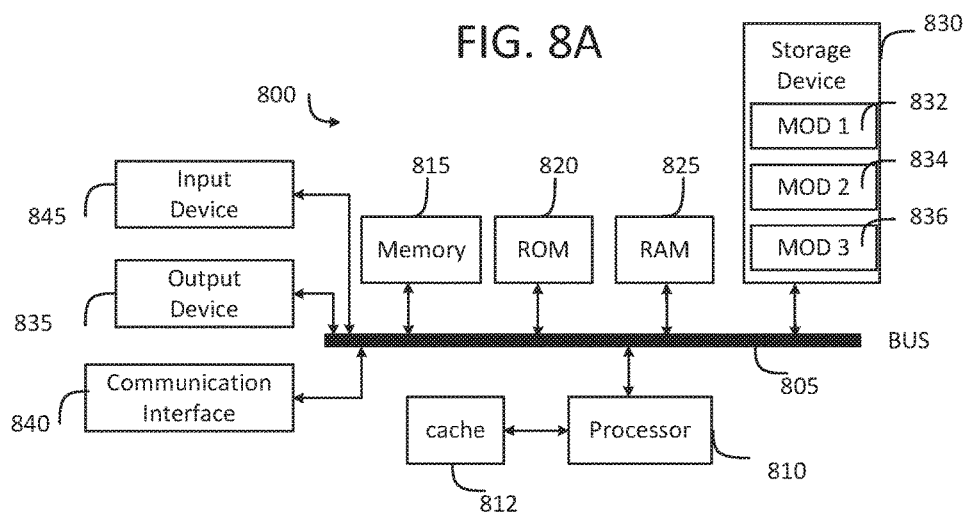
FIG. 8A and FIG. 8B illustrate example system embodiments.
Figure 8B:
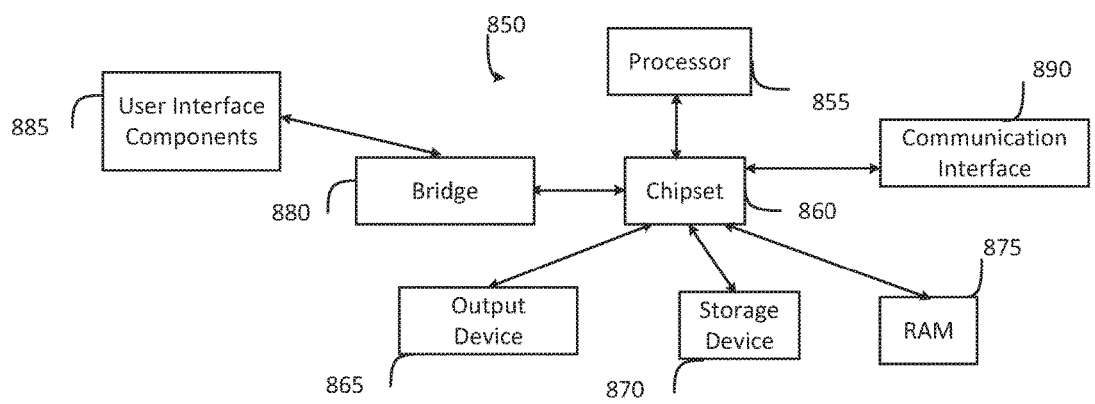

FIG. 8A and FIG. 8B illustrate example system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 870 and random access memory (RAM) 875, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 837, module 7 834, and module 3 836 stored in storage device 830, configured to control the processor 910 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 875, read only memory (ROM) 870, and hybrids thereof.

The storage device 830 can include software modules 837, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates an example computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that example systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A computer-implemented method for simulating effects of virtual objects, the method comprising:
   determining a simulated condition resulting from a simulated hit to unmanned aerial vehicle (UAV) by at least one of the virtual objects in a virtual environment, wherein the simulated condition is determined to include simulated damage associated with one or more effects;
   receiving an input for controlling the UAV;
   modifying the input in accordance with the effects associated with the simulated damage; and
   generating a control signal for the UAV based on the modified input, wherein the UAV executes the control signal to exhibit the effects associated with the simulated damage in the virtual environment.

2. The computer-implemented method of claim 1, further comprising detecting the simulated hit to the UAV based on a simulated event that results in the simulated hit.

3. The computer-implemented method of claim 2, wherein the simulated event includes a simulated weapon being fired on the UAV.

4. The computer-implemented method of claim 1, wherein the control signal is further executable by the UAV to decrease an amount of power to a motor.

5. The computer-implemented method of claim 1, wherein the simulated condition includes simulated air turbulence.

6. The computer-implemented method of claim 3, wherein detecting the simulated hit further includes:
   determining a simulated position of the simulated weapon that is fired on the UAV;
   determining an affected region based on the simulated position of the simulated weapon; and
   determining that a physical position of at least part of the UAV is within the affected region.

7. The computer-implemented method of claim 1, wherein the simulated condition further includes at least one of simulated fire, simulated static, and visual distortion resulting from execution of an altered video signal.

8. The computer-implemented method of claim 1, wherein the generated control signal is further executable by a head-up display (HUD) to visually indicate the simulated condition.

9. A system for simulating effects of virtual objects, the system comprising:
   a communication interface that receives an input for controlling an unmanned aerial vehicle (UAV); and
   a processor that executes instructions stored in memory, wherein execution of the instructions by the processor:
      determines a simulated condition resulting from a simulated hit to the UAV by at least one of the virtual objects in a virtual environment, wherein the simulated condition is determined to include simulated damage associated with one or more effects;
      modifies the input in accordance with the effects associated with the simulated damage, and
      generates a control signal for the UAV based on the modified input, wherein the UAV executes the control signal to exhibit the effects associated with the simulated damage in the virtual environment.

10. The system of claim 9, wherein the processor executes further instructions to detect the simulated hit to the UAV based on a simulated event that results in the simulated hit.

11. The system of claim 9, wherein the processor detects the simulated hit by:
    determining a simulated position of the simulated weapon that is fired on the UAV;
    determining an affected region based on the simulated position of the simulated weapon; and
    determining that a physical position of at least part of the UAV is within the affected region.

12. The system of claim 9, wherein the control signal is further executable by the UAV to decrease an amount of power to a motor.

13. The system of claim 9, wherein the simulated condition includes simulated air turbulence.

14. The system of claim 10, wherein the simulated event includes a simulated weapon being fired on the UAV.

15. A non-transitory computer-readable medium having computer readable instructions stored thereon that, when executed by a processor of a computer, cause the computer to perform a method for simulating effects of virtual objects, the method comprising:
    determining a simulated condition resulting from a simulated hit to unmanned aerial vehicle (UAV) by at least one of the virtual objects in a virtual environment, wherein the simulated condition is determined to include simulated damage associated with one or more effects;
    receiving an input for controlling the UAV;

modifying the input in accordance with the effects associated with the simulated damage; and generating a control signal for the UAV based on the modified input, wherein the UAV executes the control signal to exhibit the effects associated with the simulated damage in the virtual environment.

16. The non-transitory computer-readable medium of claim 15, further comprising instructions executable to detect the simulated hit with the UAV based on a simulated event that results in the simulated hit.

17. The non-transitory computer-readable medium of claim 16, wherein detecting the simulated hit further includes:

determining a simulated position of a simulated weapon is fired on the UAV;

determining an affected region based on the simulated position of the simulated weapon; and determining that a physical position of at least part of the UAV is within the affected region.

18. The non-transitory computer-readable medium of claim 15, wherein the control signal is further executable by the UAV to decrease an amount of power to a motor.

19. The non-transitory computer-readable medium of claim 15, wherein the simulated condition includes simulated air turbulence.

* * * * *